United States Patent Office 3,299,917
Patented Jan. 24, 1967

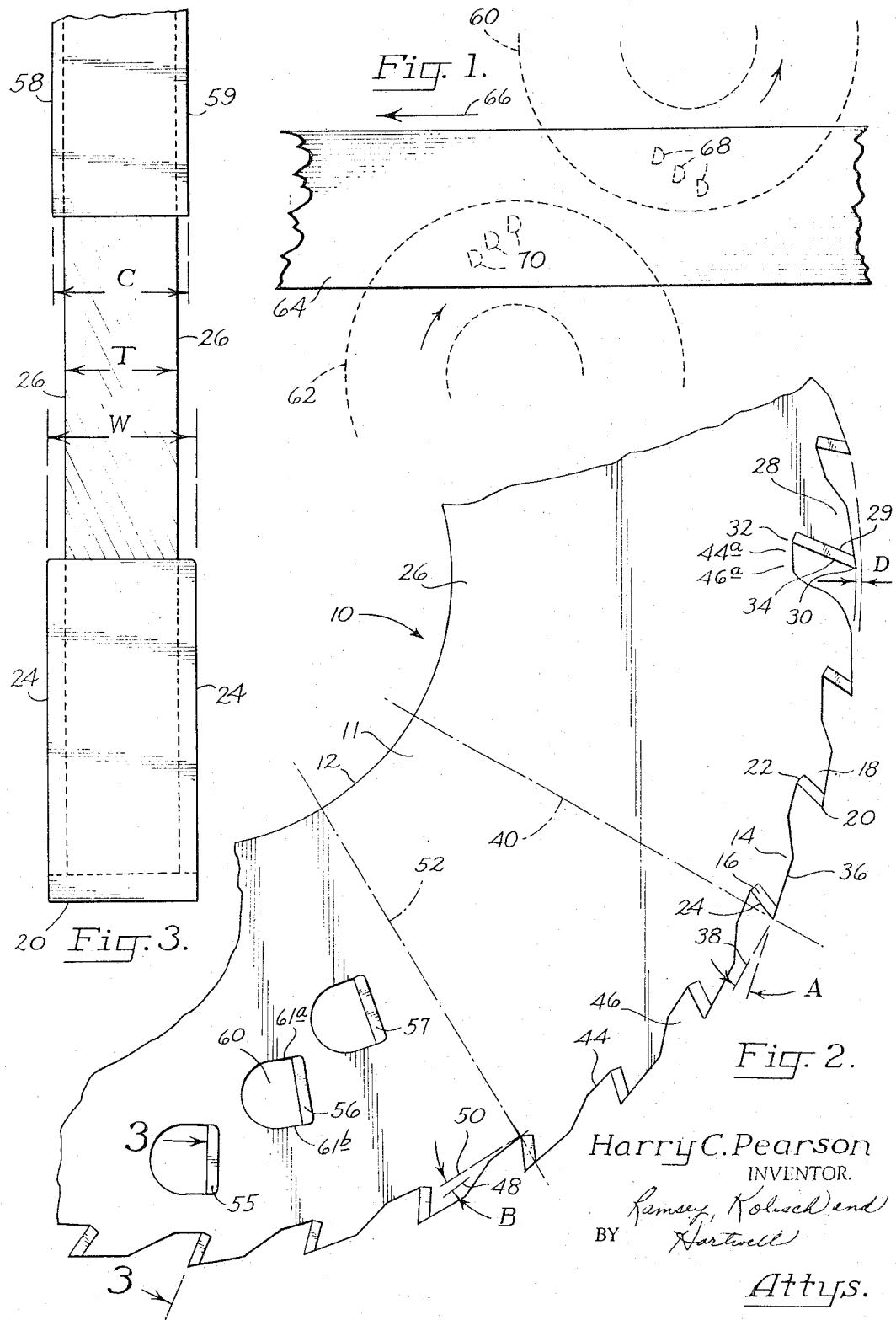

3,299,917
CIRCULAR SAW
Harry C. Pearson, Portland, Oreg., assignor to Portland Iron Works, Portland, Oreg., a corporation of Oregon
Filed Oct. 12, 1964, Ser. No. 403,185
6 Claims. (Cl. 143—133)

This invention relates to a circular saw, and more particularly to such a saw which produces over opposite faces of the blade therein a cutting action operating to chop up, pulverized and reject wood material loosened by the teeth.

Existing circular saws frequently encounter severe overheating difficulties. This overheating, caused apparently by friction between the moving faces of a saw blade and material which becomes loosened by the saw's normal cutting action, usually occurs rapidly, and results in loss of temper in the saw blade and destruction of the saw. With saws having carbide tips in the teeth thereof, localized overheating may result in the tips breaking off from the saw.

Thus, a general object of this invention is to provide a novel saw which remedies problems of overheating and of tooth breakage.

Another object is to provide a saw with novel means distributed over the faces of its blade operable to chop up and otherwise to pulverize any loosened wood material which may come between the saw blade and the workpiece being cut, thereby to inhibit the development of abnormal friction against the saw.

A more specific object is to provide such means for chopping and pulverizing loosened material adjacent the faces of a saw blade, comprising side cutters operating in a path having a width in a direction extending axially of the saw which is less than the width of the kerf produced by the saw's teeth, and which, therefore, operates only upon loosened wood material and performs none of the work of producing a kerf.

A further object of this invention is to provide an improved tooth construction for a saw, whereby material loosened by the saw teeth is cut up to a fine consistency. A special gullet between adjacent teeth prevents the collection of large amounts of coarse sawdust in pockets between adjacent teeth. The finely cut up material is readily thrown off before causing heating of the saw blade.

A still further object of this invention is to provide a novel heel giving optimum support to the cutting tips in a saw.

Yet another object is to provide a novel cutter, distributed amongst the teeth on the circumference of the saw, having a depth in a direction extending radially inwardly on the saw, which is greater than the radial depth of the main teeth in the saw. The cutter extends radially outwardly from the axis of the saw a somewhat lesser distance than the main teeth, and thus does not perform the work in cutting a kerf that the main teeth perform. The cutter operates in conjunction with the side cutters to pulverize and chop up wood material loosened by the main saw teeth.

The side cutters may in a specific embodiment of the invention herein comprise a plurality of cutter elements presenting cutting edges distributed radially across the faces of the saw, and protruding outwardly from the faces. The side-to-side dimension of the cutter elements is less than the width of the kerf produced by the saw teeth, and therefore they perform none of the normal cutting action which is performed by the saw teeth. Instead, they operate only upon wood material which has become loosened by the saw, and which comes between the faces of the saw blade and the sides of the kerf formed in the workpiece.

These and other objects and features of the invention will become more fully apparent from the following description, which is to be read in conjunction with the accompanying drawings, wherein:

FIG. 1 shows a typical disposition, in a double arbor edger, of a pair of saws embodying this invention;

FIG. 2 shows portions of one of such saws, viewing its face, the drawing being on a somewhat larger scale; and FIG. 3 is a cross-sectional view, taken along the line 3—3 in FIG. 2, showing a saw tip and a side cutter, and their relation in the blade of the saw, the drawing being on an even larger scale.

Referring now to the drawings, and first of all more particularly to FIG. 2, a portion of a circular saw is generally indicated at 10. The saw includes a circular blade 11, with an eye 12 at the center thereof, whereby the saw may be mounted upon an arbor. Teeth, generally indicated at 14, are distributed around the periphery of the saw. These teeth comprise cutting tips 16, which may be of carbide, mounted adjacent and supported by heel portions 18 which are integral with saw blade 11.

Each insertable tip 16 comprises a top 20 disposed radially outwardly on the saw which, upon rotation of the saw, moves in a path corresponding to the circumferential outline of the saw, a base 22 which is the radially innermost portion of the tip, and side cutting edges 24 located on either side of the cutting tip, which protrude outwardly from opposite faces of the saw blade.

Distributed with teeth 14 are cutters or teeth 28, having a somewhat different shape than teeth 14. At least one of these is provided, in the usual instance two or more equally circumferentially spaced about the perimeter of the saw. Each of these teeth 28 comprises a tip 29 having a top 30, a base 32 and side cutting edges 34. Tops 30 of these tips are located radially inwardly on the saw from the tops of tips 16. The difference (exaggerated for illustration purposes) in the radial distance of the two sets of tips from the center of the saw is generally indicated at D in FIG. 2. Thus, each tooth 28 upon running of the saw and upon engaging the workpiece performs less work in cutting the base of the kerf than each tooth 14. The second-mentioned set of teeth 28 have greater depth and longer side cutting edges than teeth 14, and it is for the reason of lightening the work load performed by teeth 28 that their tips are set somewhat radially inwardly of the tips of teeth 14, as described.

Each heel portion 18 is bounded by an edge portion 36 extending rearwardly of tip 16, that defines an acute angle, marked A, with respect to a plane 38, disposed perpendicular to a radial line 40 projected from the center of the saw. Angle A is relatively small, usually within the range of 6° to 12°, and this insures that there is a substantial amount of material integral with the saw blade supporting the backs of cutting tips 16.

Extending forwardly from directly adjacent the base 22 of each tip 16 is an edge portion 44 defining a gullet 46. Edge portion 36 and edge portion 44 collectively form part of an edge generally designated at 35 which extends between adjacent tips. Edge portion 44 may be perpendicular but usually inclines outwardly and defines an acute angle B with respect to a plane 50 projected through the base of the tip perpendicular to radial line 52. This angle in most instances is not more than 2° or 3°. The gullets separating the saw teeth, which thus extend no further radially inwardly than the base of the adjacent tips, are incapable of collecting sawdust in any region other than directly in front of a tip. This wood is quickly chewed up by the action of the teeth and easily thrown off by the saw. On inspecting a saw after operation, any material lodged adjacent the bases of the tips where they protrude from the faces of the saw is in the form of a fine powder. This feature is an important factor in eliminating heating of the teeth and minimizing tendencies of the tips to break off.

The gullet 46a found in front of each tooth 28 resembles the gullets which separate teeth 14 save that the gullet is substantially deeper. Thus, and referring to FIG. 2, this gullet is defined by an edge portion 44a which inclines outwardly and defines an acute angle with respect to a plane projected through the base of tip 29 which is perpendicular to a radial line extending from the center of the saw.

Shown mounted on the saw blade are side cutters 55, 56 and 57, constituting a cutter means in the saw, with cutting edges 58, 59 held outwardly, in an axial direction, from opposite faces of the saw blade. In the specific embodiment of the invention shown, three side cutters are arranged in a group in one region of the saw blade and it is contemplated that a similar group be provided on a diametrically opposite portion of the saw blade. With this arrangement of the side cutters, the saw remains in balance. To obtain this balanced condition and with three or more groups of side cutters, the groups would be arranged with equal circumferential spacing about the blade.

The side cutters may comprise carbide tips and thus be similar in construction to the tips forming the teeth of the saw. The cutters are secured to the saw blade in a manner similar to the tips as by soldering them in place. Receiving the side cutters are apertures 61 formed in the saw blade with edges 61a, 61b of these apertures extending from the fronts of the side cutters from directly adjacent the ends of the cutters. These apertures provide not only a means for mounting the side cutters, but also a space in front of the side cutters for the temporary collection of material while the same is being pulverized by the action of the cutters.

Each side cutter has a pair of side cutting edges presented outwardly from opposite faces of the saw blade shown at 58 substantially paralleling the opposite faces of the blade. These cutting edges in the embodiment shown also approximately parallel (but are inclined at a few degrees) from radial lines from the center of the saw. As seen with reference to the side cutter 55 shown in FIG. 3, the cutting edges while outwardly somewhat from the faces of the saw blade are located slightly inwardly in an axial direction with respect to the side cutting edges 24 of the tips that form part of the teeth in the saw. Put in another way, the distance indicated at C in FIG. 3, i.e., the distance in an axial direction on the saw between opposed cutting edges in a side cutter is greater than the distance T or the width of the saw blade, and less than the distance W, or the side-to-side dimension of the tips of the teeth which roughly corresponds to the width of the kerf produced by the saw.

It should be understood that some exaggeration has been made in FIG. 3 for the purpose of illustrating the invention. By way of example, in a typical 16 inch saw, the width of the tips forming the teeth may be 0.187 inch. With teeth of this width, side cutters with cutting edges some 0.167 inch apart may be utilized, the saw blade itself having a thickness of about 0.156 inch.

It will be noted, and with reference to FIG. 2, that the inner end of cutter 55 is radially inwardly of the outer end of cutter 56 and so also the inner end of cutter 56 is radially inwardly of the outer end of cutter 57. The side cutters, in a manner of speaking, thus overlap in that on running of the saw, the cutters move in circular paths in zones which overlap each other. Thus they produce a substantially continuous cutting action extending from adjacent the perimeter of the saw to the eye at the center.

Teeth 28 have been described earlier having somewhat greater depth than the main teeth of the saw. The reason for the inclusion of these teeth is to provide for a side cutting action in that region of the saw which is radially inwardly from the bases of teeth 14 and radially outwardly of the outer end of side cutter 55. The innermost part of tip 29 of a tooth 28 is radially inwardly on the saw from the outer end of the cutter 55 and thus, on rotation of the saw, this tip moves in a path which overlaps the path of cutter 55.

FIG. 3 shows in a simplified sketch a typical disposition of a pair of saws embodying this invention, as used in a double arbor edger. One saw is shown at 60, and a second saw at 62. They are mounted on arbors 63, 65, and lie in the same plane. They have edges that overlap each other, viewing the saws in the direction that a workpiece 64 travels past the saws. The saws together produce a continuous kerf through the workpiece, with the kerf produced by one being the continuation of the kerf produced by the other.

With such a saw machine, pieces of wood material may be loosened by the cutting of one saw and become wedged against the faces of this one saw, or the faces of the other saw. Sawdust removed by either saw may also become compacted and wedge against the blade faces. This wedging and compacting results in friction and overheating, which may destroy the saw rapidly, if not taken care of.

According to this invention, any overheating of the saw blade because of such loosening and removing of wood is inhibited by reason of the action of the side cutters described which function when they encounter material within the kerf to chop and otherwise pulverize such material whereby the same is reduced to fine particle size. Sawdust moving over the faces of the saw is chopped and reduced in size from the size it had when first removed from the wood. Wood slivers, knots, etc., should they be wedged within the kerf and against the saw faces, are likewise reduced to small pieces. As chopped up by the side cutters, such material is readily thrown off by the saw before any chance of overheating occurs.

It is important to note that normally the side cutters perform none of the work of producing the kerf in the workpiece. This is done entirely by the tips carried on the periphery of the saw. This makes for faster cutting and a greater life in the saw, as the side cutters are used only when necessary to aid in the removal of material which has loosened and fallen into the already formed kerf.

Thus, generally summarizing the invention, it contemplates means in the sides of a saw for chopping up and pulverizing material loosened by the usual cutting action of the saw, before such material becomes wedged between the faces of the saw blade. Furthermore, it contemplates a set of special teeth distributed around the periphery of the saw having greater depth than the main teeth, co-operating with side cutters to produce pulverizing of loosened material. Additionally it contemplates improved mountings for the tips in the teeth and an improved gullet construction, tending to minimize overheating and loss of tips.

It should be obvious to those skilled in the art that other embodiments and configurations of the invention are possible without departing from the invention. It is intended to cover all modifications and variations that would be apparent to one skilled in the art and that come within the scope of the appended claims.

It is claimed and desired to secure by Letters Patent:
1. A circular saw comprising a saw blade with opposite faces, having cutting teeth distributed peripherally on the blade, and a central eye, said teeth comprising tips mounted on the saw blade, having cutting edges protruding beyond each of the opposite faces of the saw blade, operating on running of the saw to produce a kerf having a width W, where W exceeds the thickness of the saw blade, and multiple side cutters mounted on the saw blade presenting over each face of the saw blade multiple cutting edges which terminate the side cutters over such face and which are spaced laterally outwardly of such face but are located inwardly of the cutting edges of the tips protruding beyond the same face of the saw blade, said side cutters on running of the saw moving in adjacent paths, and operating to produce a substantially continuous cutting action extending from the base of said tips to adjacent the eye of the saw blade, which cutting action is in a region having a width smaller than the width W of the kerf confined within the kerf produced on running of the saw.

2. In a saw including a saw blade having opposite faces, and cutting teeth along a margin thereof, with cutting edges protruding from each of the opposite faces of the saw blade, operable on running of the saw to produce a kerf having a width W, where W exceeds the thickness of the saw blade, means for chopping up and pulverizing wood material loosened by the saw teeth comprising cutter means mounted on the saw blade, presenting on each face of the saw blade a cutting edge which terminates the cutter means and which is spaced laterally outwardly from the face but is located inwardly of the cutting edges of the teeth protruding beyond the same face of the saw blade, said cutting edges of the cutter means on running of the saw producing a cutting action in a region confined within the kerf which region has a width less than the width W of the kerf, whereby said pulverizing and chopping means operate only on material loosened by the saw teeth.

3. In a saw, a saw blade, having opposite faces, and cutting teeth along the margin thereof with cutting edges protruding from each of the opposite faces of the saw blade, operable on running of the saw to produce a kerf having a width W, where W exceeds the thickness of the saw blade, said teeth comprising inserted tips, and heel portions integral with the saw blade supporting the backs of said tips, said tips having bases which, on the saw, are radially innermost portions of the tips, gullets circumferentially distributed around the periphery of the saw blade between said cutting teeth, said gullets extending inwardly in a radial direction toward the axis of the saw blade no further than the base of the tips on either side of the gullets, and cutter means mounted on the saw blade, presenting on each face of the saw blade a cutting edge which terminates the cutter means and is spaced laterally outwardly of the face but is located inwardly of the cutting edges of the teeth protruding beyond the same face of the saw blade, said cutting edges of the cutter means on running of the saw producing a cutting action in a region confined within the kerf which region has a width less than the width W of the kerf, whereby the cutter means may pulverize and chop material loosened by the saw teeth and moving over the faces of the blade without widening of the kerf produced by the saw.

4. A circular saw comprising a saw blade of circular outline having cutting teeth distributed around the periphery thereof, gullets separating successive teeth, and a central eye, said teeth comprising inserted tips having bases which, on the saw, are radially innermost portions of the tips, and cutting edges protruding beyond opposite faces of the saw blade, operating on running of the saw to produce a kerf having a width W, where W exceeds the thickness of the saw blade, each of said gullets being defined by an edge projecting forwardly from the tip at a point no further radially inward on the saw than the base of such tip, and that lies in a region disposed radially outwardly of a plane projected through the base of such tip which is perpendicular to a radial line passed through the base of such tip, and multiple side cutters mounted on the saw blade presenting over each face of the saw blade multiple cutting edges which terminate the side cutters over the face and which are spaced laterally outwardly of the face but are located inwardly of the cutting edges of the tips protruding beyond the same face of the saw blade, said side cutters on running of the saw moving in adjacent paths, and operating to produce a substantially continuous cutting action extending from the base of said tips to adjacent the eye of the saw blade, which cutting action is in a region confined within the kerf produced on running of the saw having a width smaller than the width W of the kerf, for the purpose of pulverizing and loosening material loosened by the saw teeth which moves over the faces of the saw without widening of the saw kerf.

5. A circular saw comprising a saw blade having opposite faces, and cutting teeth along the margin thereof, operable on running of the saw to produce a kerf having a width W, where W exceeds the thickness of the saw blade, said teeth comprising inserted tips, and heel portions integral with the saw blade supporting said tips, each of said tips including a top, a base radially inwardly on the saw from said top, and side cutting edges intermediate the top and base protruding beyond opposite faces of the saw blade, said tips including a first set of one depth, mounted so that the tops of the tips move in a circular path corresponding to the circumferential outline of the saw, and at least one tip of substantially greater depth, mounted so that its top moves in a path radially inwardly from the path of the first set of tips, and cutter means mounted on the saw blade, presenting on each face of the saw blade a cutting edge which terminates the cutter means and is spaced laterally outwardly of the face of the blade but is located inwardly of the cutting edges of the tips protruding beyond the same face of the saw blade, said cutting edges of the cutter means producing a cutting action on running of the saw in a region confined within the kerf which region has a width less than the width W of the kerf, the cutting edge of the cutter means which is presented outwardly from one face of the saw blade also being positioned on the saw so as to move in a path joining the path in which the side cutting edge of said one tip moves on said one face of the saw blade and the cutting edge which is presented outwardly from the other face of the saw blade also being positioned on the saw so as to move in a path joining the path in which the side cutting edge of said one tip moves on said other face of the saw blade.

6. In a circular saw, a saw blade and teeth around the perimeter of the saw movable in a circular zone and having side edges operable to produce a kerf, said teeth having a width which exceeds the thickness of the saw blade, side cutters presenting cutting edges protruding out from opposite faces of the saw blade which move on rotation of the saw in paths disposed inwardly of the side edges of the teeth, said side cutters having ends radially outwardly on the saw which, on the saw, are disposed radially inwardly of innermost portions of said teeth, so that the side cutters on rotation of the saw move in a circular zone radially inwardly of the zone in which the teeth move, and means distributed with said teeth, with cutting edges protruding from opposite faces of the saw blade, for producing side cutting in a region overlapping the zone in which said teeth move and adjacent the zone in which said side cutters move.

References Cited by the Examiner

UNITED STATES PATENTS

| 342,535 | 5/1886 | Perkins | 143—143 |
| 2,657,720 | 11/1953 | Wolfe | 143—140 |
| 2,696,229 | 12/1954 | Drake | 143—140 |
| 2,965,143 | 12/1960 | Feldmann et al. | 143—133.2 |

FOREIGN PATENTS 530,384   9/1956   Canada.

DONALD R. SCHRAN, *Primary Examiner.*